Feb. 5, 1952 — L. OCKENFELS — 2,584,909
POULTRY NEST
Filed Oct. 15, 1948 — 2 SHEETS—SHEET 1
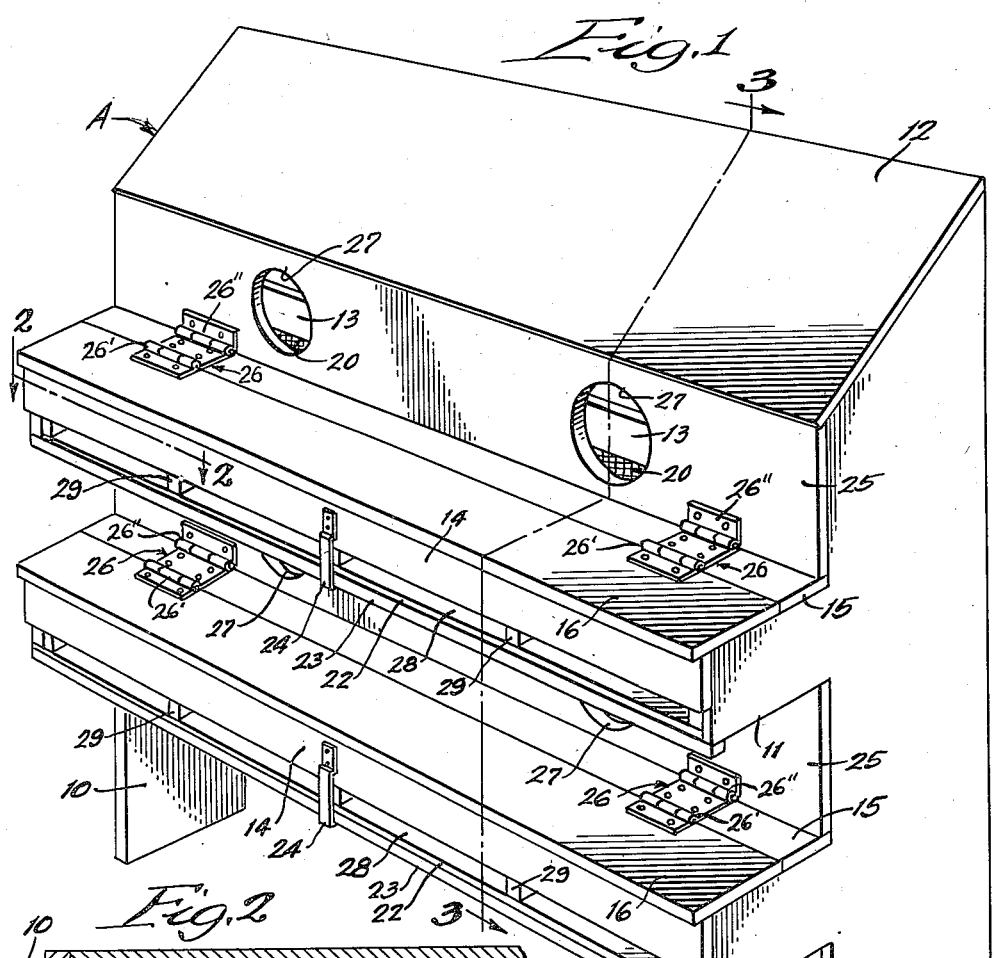
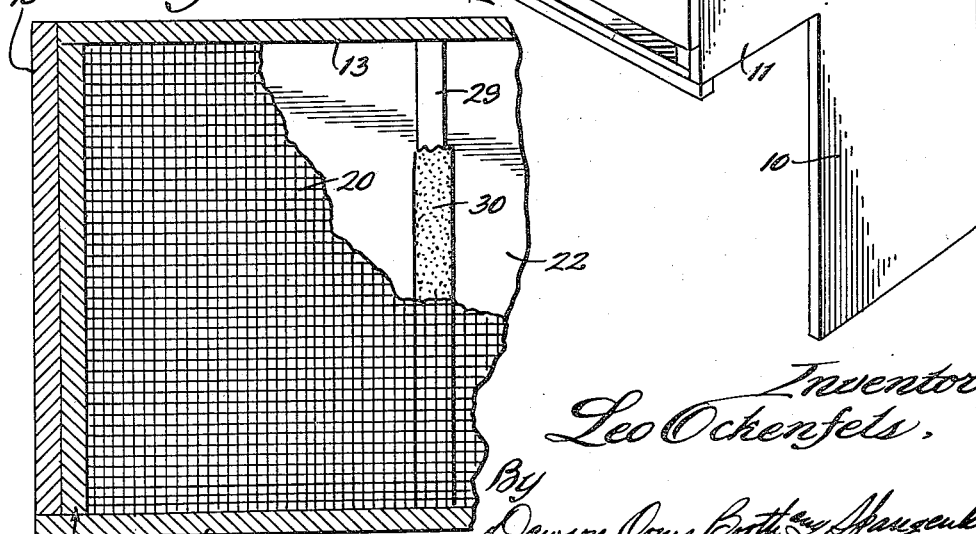
Inventor:
Leo Ockenfels,
By Dawson, Ooms, Booth & Spangenberg,
Attorneys.

Feb. 5, 1952  L. OCKENFELS  2,584,909
POULTRY NEST
Filed Oct. 15, 1948  2 SHEETS—SHEET 2
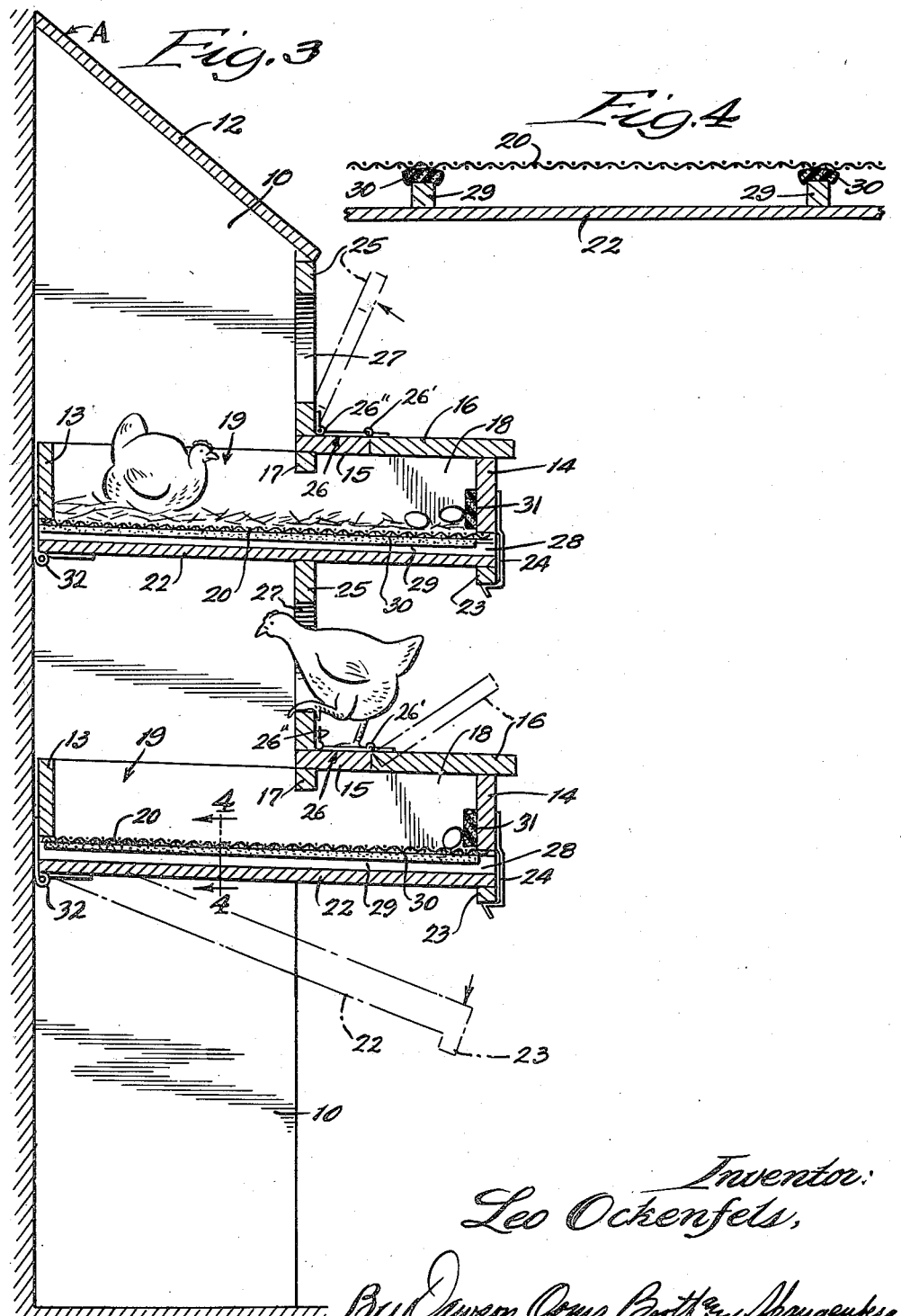

Patented Feb. 5, 1952

2,584,909

UNITED STATES PATENT OFFICE 2,584,909

POULTRY NEST

Leo Ockenfels, Watkins, Iowa

Application October 15, 1948, Serial No. 54,798

4 Claims. (Cl. 119—45)

This invention relates to a poultry nest.

Various types of poultry nests employing screens upon which the eggs are laid and which direct the eggs toward cooling compartments have been provided but such nests have been relatively unsuccessful because of various features. One reason has been the unwillingness of hens to enter nests equipped with metal screen, etc. because of the unfamiliar environment provided by such structure. Further, the structures have provided too much light and the screen employed has been suspended over a chamber rendering the same uninviting. The breakage of eggs in such nests has also been a disadvantage resulting from their use.

An object of the present invention is to provide a nest structure of inexpensive design which is readily rendered attractive to hens, etc. at the very outset while at the same time providing means for readily reducing the amount of litter employed as the hens become accustomed to the nest. Still another object is to provide a readily accessible structure for the placing of litter therein while at the same time normally providing a dark interior which is attractive to the hens and with a minimum of draft, etc. Still another object is to provide a closure means below the nest for the removal of droppings, etc., while at the same time providing a dark closure adjacent the wire and rendering it attractive to poultry, and while at the same time providing a ventilating space in a forward compartment in which the eggs are received and cooled. A further object is to provide improved means for resiliently supporting the screen within the two compartments and for protecting the eggs against breakage. Other specific objects and advantages will appear as the specification proceeds.

The invention is illustrated in a single embodiment, by the accompanying drawings, in which—

Fig. 1 is a perspective view of a nest structure embodying my invention; Fig. 2, a horizontal sectional detail view on an enlarged scale, the section being taken as indicated at line 2 of Fig. 1; Fig. 3, a vertical sectional view, the section being taken as indicated at line 3 of Fig. 1; and Fig. 4, an enlarged detail sectional view, the section being taken as indicated at line 4 of Fig. 3.

I have discovered that a poultry nest employing a screen which directs the eggs forwardly from the nest into an egg compartment, can be rendered attractive immediately by providing the nest with a front closure having entrance openings, the closure normally maintaining the interior of the nest relatively dark but being hinged for opening to permit litter to be deposited upon the screen and arranged in nest form, such closure also permitting the operator to gradually remove the litter after the hens become accustomed to the nest so taht eventually (usually within about two weeks) all the litter can be removed and thereafter the nest can be used without any litter. By the use of the closure member which is hinged to swing to open position when desired, the operator can provide at the outset a very attractive nest to which the poultry will go without hesitation while at the same time such closure facilitates the gradual reduction or removal of the litter over a period of time. This means has proved to be one secret of the success in the use of screen nests. Further, the screen has been rendered attractive to the hens by providing a hinged floor that lies close to the screen above and in a direction parallel therewith so as to close off light from the bottom portion of the nest and to create the feeling that the screen is not suspended but really lies over a solid body. Further, by supporting the screen upon resilient members and providing the front of the compartment with resilient buffers, the eggs are collected in the egg compartment without breakage.

The nests may be formed singly or in superposed relation and in any desired number. Further, the nest structure or casing A may be formed of any suitable material such as wood, metal, composition materials, etc. In the specific illustration set out, I have shown a side panel member 10 of a shape illustrated more clearly in Fig. 1 and having spaced forwardly extending walls 11. A downwardly inclined top wall 12 closes the nest structure. The rear of the structure is left open but is adapted to be closed by the wall of the building against which the nest structure is placed.

Extending across the rear of the nest structure are the spaced nest walls 13, as shown more clearly in Fig. 3, and extending between the forward ends of the walls 11 are the front closure members 14. Fixed boards 15 extend between the rear top edge portion of the walls 11. Hinged to the boards 15 by pivot portion 26' of double hinge 26 is a closure member 16, as shown best in Fig. 3. Thus, in the illustration given boards 15 cooperate with closure members 16 to provide platforms over each of the egg compartments. I prefer to equip the boards 15 each with a depending short wall 17 which extends downwardly into the compartment below and forms a partial partition between the front compartment 18, which might be called an egg compartment, and the rear compartment 19, which may be called a nest compartment. A screen member 20 is secured to the bottom of each wall 14 so as to form a floor for each of the nests.

The screen may be formed of metal, plastic, or any other suitable material. It is preferably one-half inch mesh wire and the pitch of the wire is preferably about one inch per foot. The downward pitch of the screen 20 from the wall 13 to the front wall 14 is sufficient to cause the eggs to work their way forwardly into compartment 18 so that they are there collected in a relatively cool chamber.

In the illustration given, for both the upper and lower nests as shown in Fig. 3, is the vertical leaf of a hinge 32 secured to nest walls 13. The lower leaf of the hinge is secured to a bottom or tray member 22. The bottom member 22 is preferably supported close to the screen 20 and preferably about one inch therefrom in order to exclude light from the screen and to prevent draft thereon. The bottom 22 extends forwardly in a line substantially parallel with the screen 20 and is equipped at its forward end with a cross-strip 23. A spring latch member 24 is provided for releasably locking the bottom member 22 in the above described parallel position with screen 20.

A hinged closure plate 25 is provided in the upper portion of each nest, the pivot portion 26" of hinge 26 supporting the plate being carried by each of the stationary boards 15, as shown more clearly in Figs. 1 and 3. The closure member 25 is preferably provided with at least one entrance opening 27. In the illustration given and as shown best in Fig. 1, a pair of such openings are provided. The closure 25 normally maintains the interior of the nest relatively dark and therefore attractive to the poultry while, at the same time, the closure 25 may be swung forwardly to lowered position to permit the placing of litter within the nest or to permit the removal of litter therefrom. In the specific illustration given in Fig. 3, it will be noted that the lower closure member 25 serves also as a means for supporting the upper bottom member 22 in closed position. When the closure member 25 is mounted on the top or uppermost nest of a tier of nests, it cooperates with the roof 12 instead of the floor member 22.

Each of the bottom members 22 is preferably left open at its forward end to provide a ventilating space 28, as shown best in Fig. 1 so that air may enter and cool the eggs which collect near the forward end of the compartment 18.

The bottom 22 is provided with a number of spaced ribs 29 upon which are placed resilient pads 30 of foam rubber or other suitable material. The rubber pads 30 support the screen 20 so that eggs falling upon the screen or upon the screen portions over the pads are cushioned and protected against breaking. I also prefer to provide the inner side of each wall 14 with a resilient pad 31 of foam rubber or other suitable material to prevent breakage of the eggs as they move forwardly into compartment 18.

*Operation*

In the operation of the nest or nests, I prefer to open the closure plates 25 by swinging them downwardly so as to expose the screen 20 throughout the entire length of each nest. Upon the screen, I arrange litter such as straw, excelsior, etc., so as to provide attractive nests for the poultry. The closure plates 25 are then swung to closed position. The hens have no hesitation in entering the nests because of the litter disposed over the screens and the nests are therefore effective in operation from the outset. Little by little, as the hens become accustomed to laying eggs within the nests, the litter may be removed until finally after two weeks or so, all of the litter will have been removed and thereafter the hens will continue to lay because of their familiarity with the surroundings. It will be understood that the quantity of litter kept within the nests during the training period may be varied as desired and the removal or rate of removal therefrom may be varied to meet the requirements of the hens being trained. After the training period described, no further litter need be placed within the nests until it is desired to train a new group. The closure 25 is particularly useful in that it preserves a dark interior for the nests while providing access thereto and while at the same time being readily open to expose the next compartment from one end to the other.

When it is desired to clean the nest compartment, the bottom members 22 may be swung downwardly so as to provide an inclined tray pitched forwardly. The inclination of the tray directs the droppings, etc. in front of the nest structure where they may be readily removed. I have found that excellent results are obtained by maintaining the bottom 22 normally in a plane substantially parallel with the screen 20. This arrangement provides a fixed space between the screen and the bottom so that the screen is shielded from light and also from substantial air currents. The hen is given the impression that the screen forms the bottom of the compartment and is a substantially solid structure. At the same time the parallel arrangement described provides an air cooling space at the front of each egg compartment 18 so that the entering air is directed against the eggs which have advanced toward the forward wall 14 and thus the eggs are rapidly cooled.

The eggs may be collected upon raising the door 16 at the front of each compartment 18.

While in the foregoing description, I have shown a specific structure illustrating one embodiment of the invention in considerable detail, it will be understood that such details of structure may be varied widely by those skilled in the art without departing from the spirit of my invention.

I claim:

1. A poultry nest comprising a casing providing at least two superposed nest compartments and providing also at least two superposed egg compartments each communicating at its rear with a nest compartment, a screen supported at an inclination below each of said nest compartments and extending forwardly under the egg compartment communicating therewith, a tray member hinged at its rear to said casing below each nest and extending forwardly below the nest and egg compartment communicating with the nest compartment in a position substantially parallel with the screen, and a closure plate hinged at its bottom upon said casing and extending between the lowermost nest and the tray member thereabove to support said tray in said parallel position, said closure plate having an entrance opening therein and being adapted to be swung downwardly to permit the lowering of the tray member thereabove.

2. A poultry nest comprising a casing providing superposed nest compartments, a depending partial partition in each of said compartments for dividing it into a rear compartment which serves as a nest and a front compartment which serves as an egg compartment, a screen supported at an inclination and extending along the bottom of each of said superposed compartments and for directing eggs from the next compartment into the forward or egg compartment, a tray member hinged at its rear to said casing below each of said superposed compartments, means for releasably supporting the front end of each closure tray, a platform over each of said egg compartments, and a closure plate provided with an entrance opening hingedly mounted upon the lowermost of said platforms and swingable to a position against the closure tray thereabove, said closure plate being swingable outwardly and downwardly to permit said upper tray member when released at its forward end to drop downwardly to an inclined position for discharging droppings collected thereon.

3. A poultry nest structure comprising a casing providing superposed nest compartments and superposed egg compartments forwardly of and aligned with said nest compartments, a screen supported at an inclination below each of said nest compartments and extending forwardly under the egg compartment communicating therewith, a tray member hinged at its rear to said casing below each nest and extending forwardly below each nest and the egg compartment communicating therewith in a position substantially parallel with the screen and in open communication with said screen for receiving droppings therefrom, a platform over each of said egg compartments and equipped with a hinged member for providing access to the egg compartment, and a closure plate provided with at least one entrance opening hingedly mounted upon the lowermost of said platforms so that the upper portion of the closure plate engages the closure tray thereabove, said closure plate being swingable forwardly to allow said tray member thereabove to swing downwardly at an inclination for the discharge in a forward direction of the droppings collected thereon.

4. A poultry nest comprising a casing providing superposed compartments, a partition extending across the upper portion of each compartment to divide it into a rear nest compartment and a forward egg compartment, a screen supported at an inclination below each of said superposed compartments for directing eggs from said nest compartment into said egg compartment communicating therewith, a platform extending over each of said egg compartments and equipped with a hinged door for providing access therethrough, a closure plate hinged to each platform at the rear thereof and equipped with entrance openings, tray members hingedly mounted at their rear to said casing at a spaced distance below each of said screens and in open communication with said screens to receive droppings therefrom, said lowermost closure plate being swingable forwardly to provide a space between it and the tray member above, and means carried by said casing for releasably supporting the forward ends of said tray members to maintain them normally in a position parallel with said screens, said tray members being swingable downwardly when the lower closure plate is moved forwardly to discharge droppings collected upon said tray members forwardly of said casing.

LEO OCKENFELS.

REFERENCES CITED

The following references are of record in the file of this patent:

UNITED STATES PATENTS

| Number | Name | Date |
|---|---|---|
| 953,172 | Kullander | Mar. 29, 1910 |
| 1,402,790 | Olson | Jan. 10, 1922 |
| 1,920,051 | Barney | July 25, 1933 |
| 1,952,521 | Vaughan | Mar. 27, 1934 |
| 2,158,831 | Plante | May 16, 1939 |
| 2,501,475 | Muehlfeld | Mar. 21, 1950 |